Dec. 17, 1935. W. A. VAN BERKEL 2,024,404
SLICING MACHINE
Filed March 25, 1932 3 Sheets-Sheet 1

Inventor:
Wilhelmus Adrianus van Berkel
By Cheever, Cox + Moore
Attys.

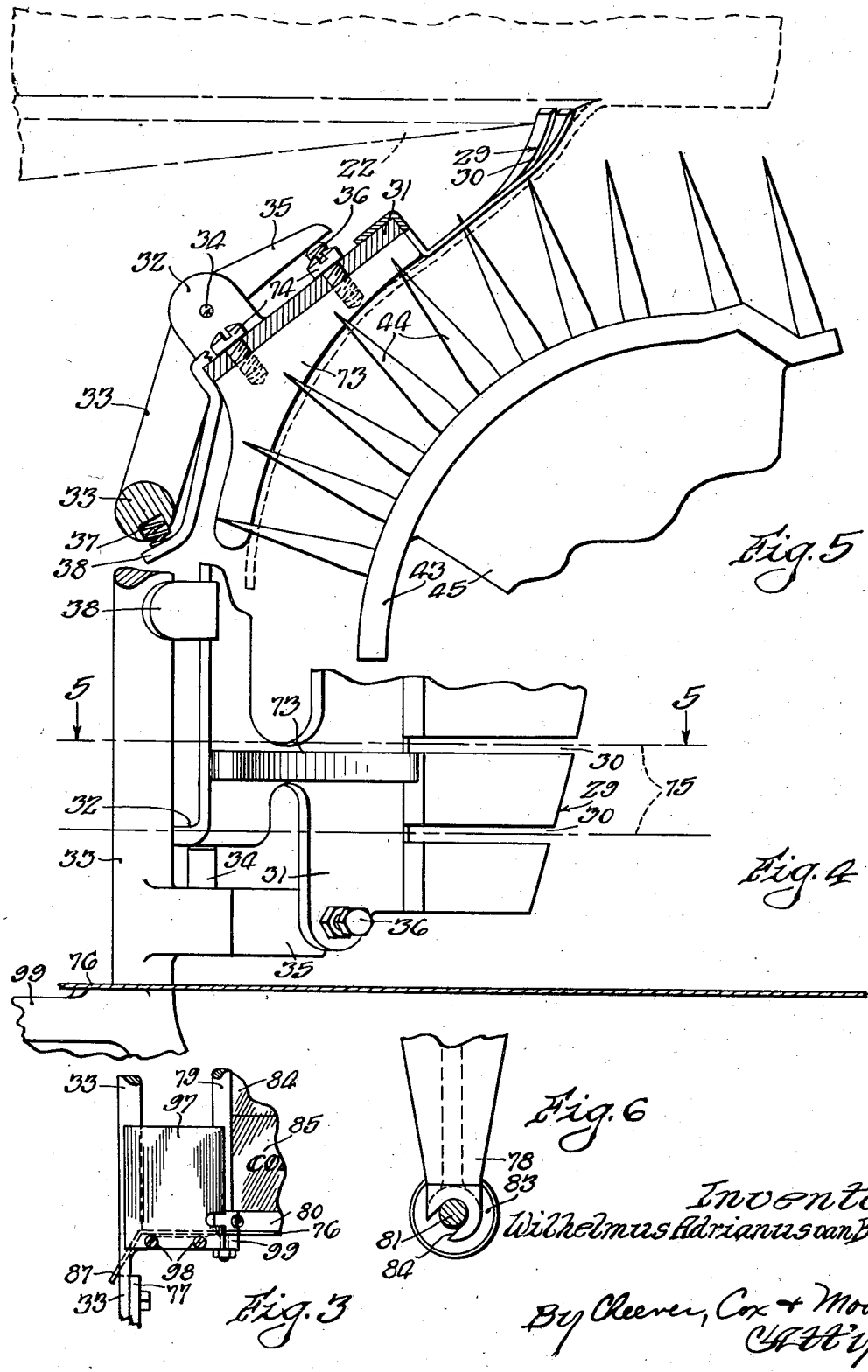

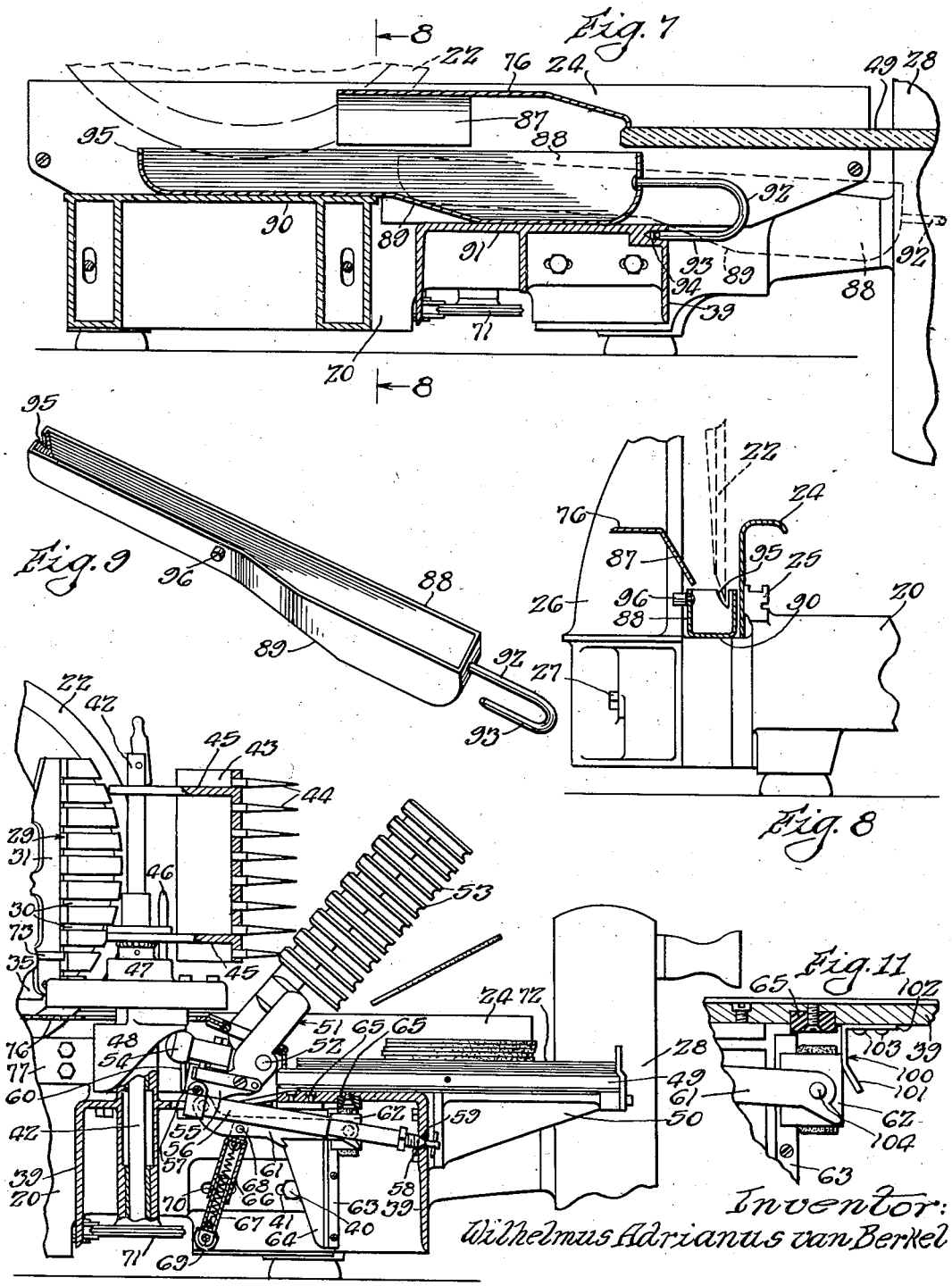

Patented Dec. 17, 1935

2,024,404

UNITED STATES PATENT OFFICE 2,024,404

SLICING MACHINE

Wilhelmus Adrianus van Berkel, Clarens, Montreux, Switzerland, assignor to U. S. Slicing Machine Company, La Porte, Ind., a corporation of Indiana Application March 25, 1932, Serial No. 601,244

7 Claims. (Cl. 146—94)

The present invention relates to a slicing machine and particularly to that type of slicing machine such as is shown in my Patent No. 1,976,863, dated October 16, 1934.

An object of the present invention is to provide a stacking mechanism for a slicing machine which will more efficiently stack the slices than devices as shown in my co-pending application and operate more efficiently due to various improvements which will hereinafter be described.

A specific object of this invention is to provide an additional member for forcing narrow slices of meat onto the prongs of the drum which conveys the slice away from the knife after it is formed, and is designed primarily to take care of narrow strips of bacon which are generally held by only two rows of prongs near the bottom of the stacking mechanism.

Another object of this invention resides in the provision of mechanism for increasing the friction of the brake for the discharge fly near the end of its travel during discharging movement to arrest the movement of the fly more quickly without jarring movement.

More specifically, the means for increasing the braking effect on the brake which retards the fly comprises a tension spring or its equivalent for holding the brake with a yielding tension against the braking surface.

Another object of this invention resides in a novel form of guard which acts also as an advertising device for displaying the slices to the customer as they are being formed and carried to discharge position while at the same time drawing attention to certain wording on the guard to which it is desired to direct the customer's attention.

More specifically, this guard comprises a transparent upper portion and a non-transparent lower portion which is provided with the wording spoken of.

Another object of this invention is to provide a pivotal mounting for the guard which guards the rotating drum, and means for holding it releasably in operative position against movement about its pivot. By releasing the releasable means, the guard may be swung about its pivot into a position whereby the inside may be readily cleaned and other portions of the stacking mechanism rendered accessible for repair or cleaning or the like.

Another object of this invention resides in the provision of a suitable guard which acts also to deflect scraps and the like into a scrap pan located beneath the knife.

Another object of this invention resides in the provision of a scrap pan extending a substantial distance in the direction of the cutting plane of the knife and forwardly thereof to a position somewhat below the slice receiving plate whereby scraps etc., which fall from the knife will be received by the scrap pan and can be readily removed by the operator and from the operator's position. The scrap pan is also held in position by a handle thereon and is provided with means for assisting in positioning the same properly in operative position without the operator stooping down to look under the slice receiving plate beneath which the scrap pan is inserted.

Other objects of this invention will appear hereinafter as the description thereof proceeds, the novel features, constructions, and combinations being clearly set forth in the appended claims.

In the drawings:

Fig. 3 is a fragmentary view of a guard, looking in the direction 3—3 in Fig. 1.

Fig. 4 is a fragmentary elevational view of the portion of the slice deflector showing the additional finger for bacon slices.

Fig. 5 is a section along the line 5—5 of Fig. 4.

Fig. 6 is a view taken along the line 6—6 of Fig. 2.

Fig. 7 is a vertical sectional view substantially in the cutting plane of the knife showing the arrangement of the scrap pan and the plate for deflecting some of the scraps into the pan.

Fig. 8 is a cross-section taken along the line 8—8 of Fig. 7.

Fig. 9 is an isometric view of the scrap pan.

Fig. 10 is a side elevational view of the stacking mechanism with parts thereof broken away for the sake of clearness, and Fig. 11 shows a modification of the mechanism shown in Fig. 10.

Figure 1:
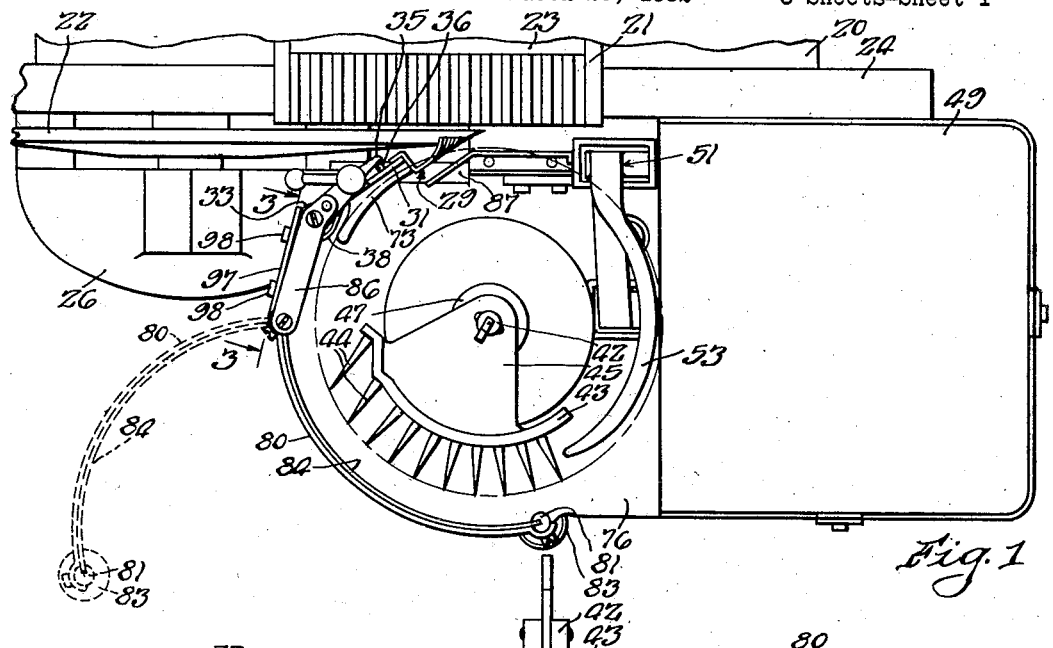
Fig. 1 is a plan view of a slicing machine embodying stacking mechanism made according to this invention.
Figure 2:
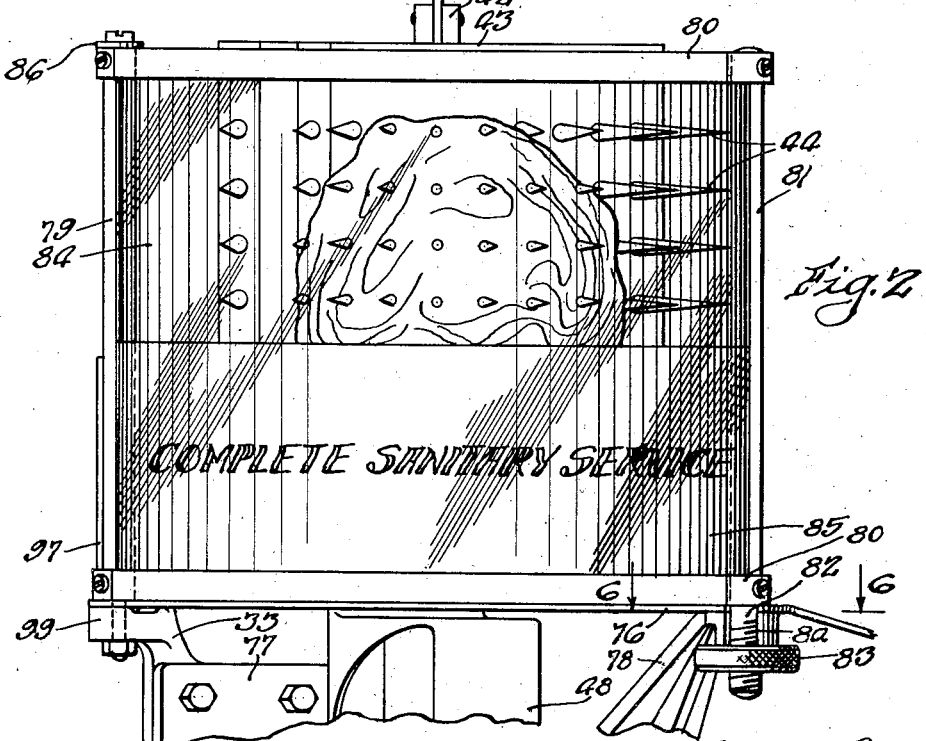
Fig. 2 is an elevational view of the guard which prevents the operator and customer from accidentally coming into contact with the prongs on the stacking mechanism.

The slicing machine comprises the usual base member 20 upon which there is slidably mounted a carriage 21 which is provided with the usual bearing members, and this carriage reciprocates past the knife 22 so that slices may be cut from the substance. The carriage 21 is also provided with a feed mechanism of any well known type to advance the feed plate 23 toward the cutting plane of the knife so that uniform slices are cut therefrom. The rollers which guide the carriage in its travel are mounted on a track which is covered by a guard 24 of a cross section substantially as shown in Fig. 8. This guard prevents foreign matter from being thrown onto the track 25 upon which the rollers on the slicing machine carriage travel.

There is a chain box 26 mounted on one side of the base 20 and secured thereto by suitable bolts such as 27. This chain box encloses a chain which drives the knife in a well known manner from mechanism operated by the fly wheel 28 mounted on the operator's side of the machine. As the slices are cut, they are deflected away from the knife by means of a deflector 29 having a series of grooves 30 therein as is best illustrated in Fig. 4. This slice deflector is mounted in any suitable manner adjacent the knife, but is preferably mounted as described in my Patent No. 1,976,863 hereinbefore referred to.

The main portion of this slice deflector is carried by a plate 31 provided with lugs 32 on the upper and lower portions thereof and these lugs are arranged between corresponding lugs carried by a bracket 33 which in turn is supported upon the chain box of the slicing machine as is more fully disclosed in my afore-mentioned patent. The slice deflector is so mounted on the bracket 33 that it can be pivoted about the center 34. A stop lug 35 on the bracket 33 engages the end of an adjustable screw 36 whereby the pivotal movement of the slice deflector toward the knife is positively limited but may be adjusted as desired. A spring 37 arranged within a recess in the bracket 33 engages an extending finger 38 secured to the slice deflector and yieldingly urges the same in a counter-clockwise direction as viewed in Fig. 5 to bring the adjustable stop screw 36 against the lug 35.

To one side of the base 20, of the slicing machine, there is secured a bracket 39 by means of a plurality of machine bolts 40 passing through slots 41 in the bracket 39 into tapped openings in the base 20. Rotatably mounted in this bracket is a vertically extending spindle 42 which extends upwardly a considerable distance and releasably carries the segment 43 of a cylindrical member which I will hereinafter refer to as a drum. On this drum there is provided a plurality of needle-like prongs 44 which are arranged in horizontal rows and pass through the slots 30 in the deflector as they pass the same. Therefore, as the slices are severed by the knife and deflected away from the knife by the deflector 29, the portions of the deflector on opposite sides of the slots force the slice onto the prongs 44.

The drum 43 has the webs 45 which are formed integrally therewith and embrace the rotating spindle 42. A pin 46 secured to a collar 47 which in turn is secured to the spindle 42 passes through an opening in the lower web so as to cause the drum to rotate with the spindle. There is a cam 48 secured to the spindle 42 and this cam is adapted to actuate the discharge fly which discharges the slices onto a slice receiving plate 49. This slice receiving plate 49 is supported by brackets 50 mounted on the bracket 39 or in any other suitable manner.

The discharge fly 51 is pivoted at 52 and comprises a plurality of fingers 53 extending parallel to each other. When the discharge fly is in a vertical position, the fingers 53 are parallel to a horizontal plane and are so arranged that as the slice is brought around into a position adjacent the slice receiving plate 49, the fingers 53 will be arranged between the rows of prongs 44 and between the slice carried by the prongs and the outer surface of the drum 43. In order to discharge the slice from the prongs there is provided a roller 54 mounted upon a tail piece 55 of the fly 51 and this roller engages the under side of the cam 48, so as the cam rotates with the spindle 42, the roller travels along the lower surface of the cam and raises the fly into a vertical position. When the drum is in the discharge position adjacent the plate 49, the roller 54 moves off the lowest portion of the cam and is urged vertically by a spring (to be described presently) with a quick motion, the cam being provided with a sharp drop-off at 60 for this purpose. The fly is rotated in a clockwise direction as viewed in Fig. 10 by means of a compression spring arranged within the telescoping case 56 as is more fully described in my aforementioned patent. The left hand end of the telescoping casing 56 is pivoted at 57 to the tail piece 55 and has a conical point 58 abutting against the edge of an opening 59 in the bracket 39. It will therefore be noted that the spring constantly urges the fly in a clockwise direction and the cam moves the fly in a counter-clockwise direction against the action of the spring.

When the fly is discharging the slice from the prongs 44, the spring is the actuating power and the roller 54 is not being actuated at all by the cam. Therefore there is a quick movement of the discharge fly and it is desirable that the end of the movement of the discharge fly be suddenly arrested but without jar to the operating parts so as to make a silent machine which will effectively discharge the slices as they are brought into slice discharge position. In order to accomplish this result, I provide an arm 61 having one end thereof pivoted to the tail piece 55 and the other end thereof provided with a brake shoe 62 which is pivoted on the arm and slides on a rigid braking member 63 carried by the downwardly extending bracket 64 secured by the screws 65 to the under side of the upper portion of the bracket 39. Therefore as the spring moves the fly to discharge position, the clockwise movement of the tail piece 55 draws the brake against the braking surface 63 and the braking effect increases toward the end of the discharge movement when the pull on the brake is substantially perpendicular to the direction of its movement along the braking surface 63. Generally the brake stops the fly before the brake has traveled the full upward permitted extent of its movement, but to prevent damage in case the travel of the brake exceeds its normal travel I provide a rubber bumper or the like 65 near the upward extent of its path of travel. I have found however, that a more exacting braking action will take place if I place a tension spring in a position to tend to move the arm 61 in a counter-clockwise direction instead of permitting the same to be free to move about its pivotal connection with the tail piece 55. I therefore provide telescoping sections 66 and 67 pivoted respectively to the arm 61 at 68 and to the bracket 39 at 69, and provide within the telescoping members 66 and 67 a tension spring 70 which tends to draw the arm 61 downwardly or in a clockwise direction about its pivotal connection with the tail piece 55. This increases the force with which the brake 62 is held against the braking surface 63 and especially at the end of the discharge movement of the fly. As a result, the discharge fly is stopped very abruptly but without a jarring movement being imparted to the slicing machine. The quick discharge movement of the discharge fly throws the slice, and the sudden arresting of the discharge fly insures that the slice which is normally rather sticky, will be thrown free of the fly and without the necessity of having the fly move more than about 45° toward the slice receiving surface.

Instead of using the extra spring 70 for increasing the friction of the brake shoe 62 on the member 63, I can use an arrangement such as shown in Fig. 11. In this figure, there is shown a spring having a depending portion 100 and an angularly extending portion 101. The spring is attached to the bracket 39 by screws 103 passing through the portion 102 of the spring. The brake shoe 62 rides upwardly along the braking member 63 until it strikes the angularly extending portion 101 of the spring. Continued movement of the brake-shoe in an upward direction causes the spring to be forced to the right as viewed in Fig. 11, and the resiliency of the spring increases the force with which the brake shoe 62 is held against the member 63 at the time when it is most desirable to arrest the movement of the discharge fly. The spring also acts as a cushioning means for cushioning the end of the discharge movement of the fly, the same as does the spring 70. It will be noted that the pivotal connection 104 between the arm 61 and brake shoe 62 is preferably located below the angle on the spring formed by the meeting of the portions 100 and 101 so that when the discharge fly moves back to its vertical position, the arm 61 will more readily move the brake shoe 62 out of engagement with the member 63.

The spindle 42 which controls the movement of the stacking mechanism just described is driven by means of a chain 71 from the same mechanism which drives the slicing machine carriage and which is operated by the fly wheel 28 in a well known manner and is described in my patent. This insures that the stacking mechanism moves in unison with the movement of the carriage as it presents the substance to be sliced to the knife.

With the mechanism so far described, it will be apparent that the slices severed by the knife are impaled upon the prongs 44 by means of the deflector 29 and the slice is then carried around into a discharge position and in front of the fingers 53 of the discharge fly 51. As the slice arrives in this latter position, the roller 54 moves off the high position of the cam 49 and the spring moves the fly to the position shown in Fig. 10, whereby the slice is thrown onto the slice receiving surface 49 or the top sheet of a stack of papers 72 mounted on the plate 49.

It will be noted, however, that bacon slices which are very narrow will only be engaged by approximately the lower two rows of prongs, and there is some tendency for the bacon slices to curl outwardly from the drum as they are cut by the knife, and this coupled with the rapid rotation of the drum tends to throw the slices off the drum before they arrive at the discharge position. Furthermore, if the end of the slice curls, it will not be thrown flat on the slice receiving surface when discharged by the fly. Therefore, in order to insure that the bacon slices will be impaled upon the prongs properly, I provide an additional finger 73 on the slice deflector 29. This finger forms substantially a continuation of the lower part of the outer surface of the deflector, and the side thereof which is adjacent the drum is curved inwardly slightly toward the axis of rotation of the drum at the points thereof which lie farthest away from the cutting plane of the knife. This finger 73, therefore, not only tends to prevent curling of the slices as they are formed, but also impales the slices on the prongs a greater amount than the slices are impaled thereon by the deflector 29. By the time the bacon slices have been positively guided onto the prongs 44 throughout a distance substantially as illustrated in Fig. 5, the bacon slice has been formed into a definite shape and will retain that shape while held by the prongs. As a result, the bacon slice is carried over to discharge position while held properly on the prongs, and when discharged by the discharge fly will be thrown flat onto the slice receiving surface, or a piece of paper carried thereby. The finger 73, which in effect forms an extension of the lower part of the deflector, is preferably the only part of the deflector which extends more than just a short distance away from the cutting edge of the knife for the reason that it is desired to reduce the amount of resistance to the movement of the slice over the slice deflecting surface. Therefore, the major portion of the slice deflector is substantially narrow in the direction of movement of the prongs 44 except at the bottom where the additional finger 73 provides an extension to obviate such undesirable features as curling of the bacon slices or other substances which are quite narrow in a vertical direction. The finger 73 is shown attached to the plate 31 by means of screws 74.

In Fig. 4, the dot-dash lines 75 indicate the paths of movement of the outer ends of the two lower-most rows of prongs which are substantially the only ones which engage the bacon slices and carry them past the deflector 29 and finger 73.

A cover plate 76 is arranged over the actuating mechanism for the discharge fly and prevents foreign matter from dropping down on the discharge fly and makes it easier for the operator to clean the machine. This plate is supported at points outwardly from the axis of rotation of the spindle 42 by means of arms 77 and 78 secured to the side of the bracket 39 in a manner which is clearly shown in my aforementioned application. Extending upwardly from the bracket 77 is a guard supporting post 79 and this is connected by means of the arcuate flat bands 80 to another post 81 arranged parallel to the post 79. The lower end of the post 79 is rotatably mounted within the bracket 77 and the lower end of the post 81 is provided with an extension 82 which is threaded and has the thumb nut 83 threaded thereon. The bracket 78 as best illustrated in Fig. 6 is provided with a notch 84 within which the extension 82 is adapted to be arranged when the post 81 is in operative position. When desired, however, the thumb nut 83 may be loosened and the frame-work consisting of the posts 79 and 81 and flat strips 80 may be swung about the axis of the post 79 as a pivot. Between the posts 79 and 81 and strips 80, there is arranged a guard which has a transparent upper portion 84 and a non-transparent lower portion 85 upon which there appears certain wording to which the customer's attention is to be directed. The upper transparent portion 84 of the guard enables the customer to see the slice as it is severed and carried around into discharge position, and this directs his attention to the non-transparent portion 85 which is so close to the transparent portion that as a result his attention is called to the wording which wording is in the nature of advertising, or an explanation of the advantages of the machine which is being used by the butcher or delicatessen owner with whom he is trading. In this particular instance, the words "Complete sanitary service" are inscribed upon the non-transparent portion 85, and this informs the customer as to the type of service he is receiving. Of course, other wording can be used if desired. The object of using the transparent guard, however, is to draw his attention to the wording as otherwise he might not particularly notice the same. People, however, like to see wheels go around, and in the present instance, the moving drum of the stacking mechanism attracts their attention, and as a result, their attention is also directed to the wording appearing on the guard. The post 79 may be braced by a tie member 86 which extends from the post 79 to the member 33 and is secured to the upper end thereof.

The plate 76 is provided as best illustrated in Figs. 7 and 8 with a downwardly extending portion 87 which is inclined inwardly toward the knife as is best illustrated in Fig. 8.

A scrap pan 88 having portions of the bottom thereof in different horizontal planes and connected by means of a sloping portion 89 is adapted to be arranged beneath the knife and for a considerable distance in front of the knife in the direction of the cutting plane thereof. This scrap pan is adapted to rest upon the webs 90 and 91 of the chain box housing 26 and bracket 39 respectively. These webs have upper horizontal surfaces at different levels and the sloping portion 89 of the bottom of the scrap pan is adapted to raise the scrap pan into a position such that the forward end of the scrap pan, which is that appearing at the left in Fig. 7, will be raised sufficiently to seat upon the web 90 as the scrap pan is moved from the dotted line position to the full line position shown in Fig. 7. As will be noted from the dotted line position of the scrap pan, the portion 89 engages the web 91 and raises the forward end of the scrap pan onto the web 90. The scrap pan is provided with a U-shaped handle portion 92 which has the free end 93 thereof adapted to extend into the opening 94 in the bracket 39 when the scrap pan is in an operative position. This establishes and holds the scrap pan in operative position and at the same time permits the quick withdrawal of the scrap pan for the purpose of dumping the scraps therefrom. The forward end of the scrap pan is provided with a notch 95 to permit that end of the scrap pan to pass the knife. The downward extending portion 87 of the plate 76 directs the scraps into the scrap pan 88. A stop 96 on one side of the scrap pan 88 is adapted to engage the chain box as the scrap pan is moved into operative position and limit the movement of the scrap pan to the left as viewed in Fig. 7. Any other means to accomplish this purpose may be used if desired.

An additional guard plate 97 shown in Fig. 3, and in Fig. 1, is secured by screws 98 to a lateral extension 99 on the bracket 33, and this is for the purpose of further guarding persons near the machine from coming into contact with the prongs on the drum, and preventing any grease from being thrown outwardly by the prongs during the rotation of the drum.

Obviously other changes may be made in the embodiment of the invention shown in the drawings, and I wish to have it distinctly understood that I do not wish to limit my invention except as pointed out in the appended claims.

Having thus fully described my invention, what I claim as new and desire to obtain by Letters Patent is:

1. A slice deflector to be provided with a stacking mechanism which includes a conveyer with prongs thereon comprising a member having a series of relatively short fingers extending to a position adjacent the cutting edge of said knife and substantially parallel with the path of movement of the slice which is deflected, and an additional finger extending a substantial distance away from the cutting edge of the knife and forming a continuation of a portion of said slice deflector, to assist in the proper positioning of narrow slices which pass said last mentioned finger and the adjacent portions of the slice deflector.

2. In a slicing machine, the combination with a slicing knife, of means for presenting the substance to be sliced to said knife, a slice deflector for deflecting the slices away from said knife, a movable element having a plurality of prongs thereon for engaging the slice as it is severed, said deflector having a series of slots therein to permit the passage of said prongs beneath the slice engaging surface of said deflector, and an extension on said deflector extending in a direction away from said knife and in the direction of movement of the slice being severed for further impaling narrow slices on said prongs, said extension having a slice engaging surface which progressively moves toward the base of said prongs in the direction of movement of said prongs.

3. A slice deflector to be provided with a stacking mechanism which includes a conveyer with prongs thereon comprising a member having a series of relatively short fingers extending to a position adjacent the cutting edge of said knife and substantially parallel with the path of movement of the slice which is deflected, and an additional finger extending a substantial distance away from the cutting edge of the knife and forming a continuation of the lower slice engaging portion of said slice deflector to assist in the proper positioning of narrow slices which pass said last mentioned finger and the adjacent portions of the slice deflector.

4. In a slicing machine having a rotary knife, a slice deflector adjacent said knife for deflecting slices as they are cut, an impaler having prongs adjacent the deflector for impaling slices as they are cut, said deflector comprising a plurality of spaced apart fingers between which the prongs pass whereby slices deflected by the deflector will be impaled on the prongs, and a finger extending from the end of one of said first named fingers and positioned to engage relatively narrow slices for preventing curling of the slices and for insuring said slices being impaled on said prongs, said latter finger having its slice engaging surface shaped eccentrically to the path of travel of the prongs whereby to move the slice progressively upon said prongs.

5. In a slicing machine, the combination with a base, of a carriage mounted for reciprocation on said base, a knife, a bracket supporting said knife having a portion thereof connected to said base by a web having an upper surface arranged below and in spaced relation to the lower edge of said knife, stacking mechanism arranged on the side of the cutting plane of said knife opposite to the side on which said carriage is movable, a bracket secured to said base and supporting said stacking mechanism, said bracket having a web portion, the upper surface of which extends in substantially the same direction as the upper surface of said web connecting said knife supporting bracket with said base, a slice receiving tray above and in spaced relation to the web connecting said bracket and base, a scrap pan insertable from the operator's side of the machine between said web portion and said slice receiving tray adapted to rest when in operative position on the webs connecting said knife bracket with said base and said stacking mechanism supporting bracket with said base, the upper surfaces of said webs being located at different elevations, said scrap pan having the bottom portion thereof formed to hold the scrap pan in a level position while the bottom thereof rests firmly on both of said webs, the bottom portion of said scrap pan having two portions in spaced parallel planes connected by a sloping portion which assists the positioning of the scrap pan in position on both of said webs by the camming action of said sloping surface on one of said webs to raise the scrap pan so that it will be automatically positioned on the other of said webs.

6. A scrap pan for slicing machines adapted to be positioned beneath a slicing knife of a slicing machine on surfaces at different elevations and in substantially spaced parallel relation with each other comprising a hollow metal receptacle having a handle and formed with a deep section adjacent said handle and with a shallow section away from said handle whereby the bottom of the receptacle is other than in a single plane, these portions being in spaced parallel relation with each other to correspond with the differences in the perpendicular distance between said surfaces whereby said scrap pan will rest firmly upon both of said surfaces when in operative position, the bottom portions of said scrap pan which are arranged in different substantially parallel planes being connected by a sloping portion which acts in conjunction with the lowermost supporting surface of the slicing machine to raise the forward edge of the scrap pan away from the handle portion to a position such that the forward portion will move freely onto the highest of said supporting surfaces automatically as the operator moves the scrap pan toward operative position over the lower of the supporting surfaces toward said higher surface.

7. In a slicing machine having a rotary knife, a slice deflector having a deflecting surface arranged adjacent the knife for deflecting slices cut by said knife, a slice impaler movable along said deflecting surface for impaling slices cut by said knife, and a single relatively narrow finger extending eccentrically along the path of travel of the impaler a distance substantially as great as the length of the deflecting surface adapted for cooperation with a narrow slice to prevent curling of the slice and to insure the slice being impaled upon said impaler, the eccentric positioning of the said finger serving to move the slice progressively upon the impaler.

WILHELMUS ADRIANUS van BERKEL.